Figure 1:
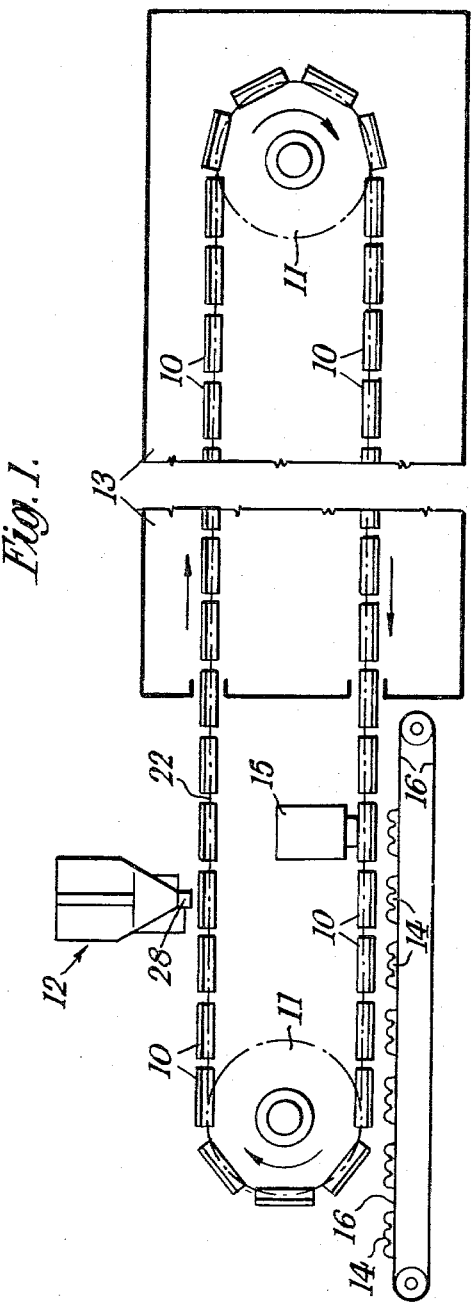

United States Patent [19]

Steels et al.

[11] 4,229,484
[45] Oct. 21, 1980

[54] PROCESS FOR THE PRODUCTION OF CENTER-FILLED BARS OF CONFECTIONERY

[75] Inventors: Gordon Steels, Peterborough; Raymond G. Dacey, Hemel Hempstead, both of England

[73] Assignee: Baker Perkins Holdings Limited, Hertfordshire, England

[21] Appl. No.: 24,451

[22] Filed: Mar. 27, 1979

[30] Foreign Application Priority Data

Apr. 11, 1978 [GB] United Kingdom ............... 14178/78

[51] Int. Cl.³ .............................................. A23G 3/00
[52] U.S. Cl. .................................. 426/279; 426/103; 426/515; 426/660
[58] Field of Search ............... 426/282, 280, 281, 631, 426/306, 289, 93, 103, 660, 277, 279, 512, 514, 515, 144; 264/DIG. 60; 425/433, 430, 435; 249/69, 92, 127, 129, 131

[56] References Cited

U.S. PATENT DOCUMENTS

| | | | |
|---|---|---|---|
| 1,829,568 | 10/1931 | Messer | 426/282 |
| 2,082,312 | 6/1937 | Todd | 426/660 |
| 3,480,251 | 11/1969 | Pietrzak | 249/127 |
| 4,014,156 | 3/1977 | Klahn et al. | 426/282 |

FOREIGN PATENT DOCUMENTS 1481177 7/1977 United Kingdom .
1510413 5/1978 United Kingdom .

*Primary Examiner*—Alvin E. Tanenholtz
*Assistant Examiner*—George C. Yeung
*Attorney, Agent, or Firm*—Watson, Cole, Grindle & Watson

[57] ABSTRACT

Center-filled bars of confectionery are made by making successive deposits of shell and filling materials into adjoining cavities of moulds moved in succession beneath coaxial depositing nozzles. The cavities in each mould are separated by webs over which shell material overflows so that successive deposits join together to form in each mould a bar having a flat base.

2 Claims, 12 Drawing Figures

U.S. Patent  Oct. 21, 1980  Sheet 1 of 4  4,229,484

PROCESS FOR THE PRODUCTION OF CENTER-FILLED BARS OF CONFECTIONERY

Centre-filled bars of chocolate are chocolate bars having a flat base and a number of protuberances of chocolate containing a centre-filling of other confectionery, the protuberances being separated from one another by comparatively thin webs of base material so that they can be snapped off from the bar for individual eating, individually or in groups.

Such bars are conventionally made by traversing a procession of moulds, each having cavities shaped to the desired form of the protuberances, in succession beneath a first depositor which deposits chocolate into the moulds, then inverting the moulds to discharge chocolate in excess of that required to leave in the cavities shells of chocolate which line the walls of the cavities, then traversing the moulds beneath a second depositor which deposits filling material into the shells of chocolate, then traversing the moulds beneath a third depositor from which further chocolate is deposited to cover the deposits of filling material, this layer of chocolate being strickled to give it a level top surface which will form the base of a chocolate bar, and finally inverting the moulds to discharge the moulded bars therefrom.

This procedure is possible, despite the fact that the shells of the first chocolate deposits have cooled before the hot second deposits of chocolate are made, because chocolate contains fat in its composition and the two deposits of chocolate will fuse and weld together at their interface to leave no trace of a joint and provide a sealed enclosure for the fillings to protect them from deterioration during storage prior to sale.

It is not, however, applicable to the production of centre-filled bars in which the shell material is toffee, fudge, butterscotch or other similar sugar-based materials because these will not readily fuse together, as in the case of chocolate, and will leave an unsightly and weak point through which the centre material, if in a liquid or semi-liquid form, could leak and affect the appearance and stability of the product.

With a view to overcoming this difficulty, the invention provides a process for the production of bars of centre-filled confectionery, each having a flat base and a number of protuberances all of shell material, the protuberances being separated by thin webs and containing a filling of material different from the shell material, which comprises traversing a procession of moulds, each having a series of aligned cavities separated by webs, beneath a depositor, which deposits both shell and filling materials into the cavities of each mould in succession to form in each cavity a deposit consisting of filling material totally enclosed by shell material which overflows onto the web or webs separating each cavity from its neighbour, successive deposits being made in sufficiently rapid succession for the over-flowing portions of shell material on the webs to join together. Such fusion is possible even when the shell material is a sugar-based material because there is no difficulty in moving the moulds past the depositor fast enough to ensure that each deposit will be made before the shell material of the preceding deposit has cooled sufficiently to prevent fusion together of the portions of the two deposits overlying the web between the cavities containing the deposits.

The shell material may, for example, be toffee, fudge, fondant creme, jelly or butterscotch and examples of suitable filling materials are chocolate, fudge, nougat and certain gelatine-based confections.

The depositor may be of the kind described in British Patent Specifications Nos. 1,481,177 and 1,510,413 and include two separate hoppers each independently heated and respectively containing shell material and filling material and a co-axial nozzle through which these two materials are deposited simultaneously as described in these specifications.

Figure 4:
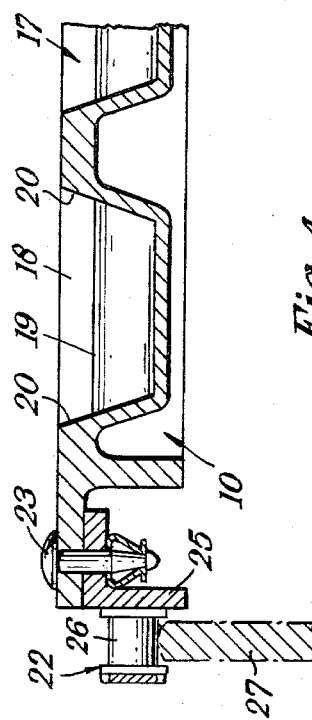
Figure 3:
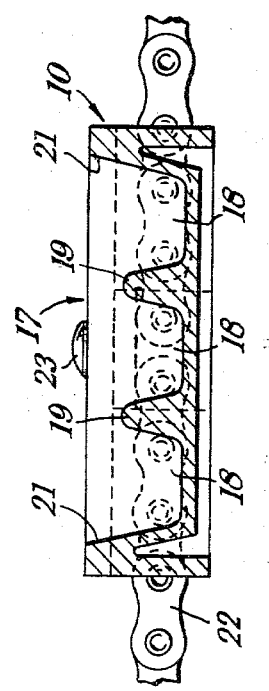
Figure 2:
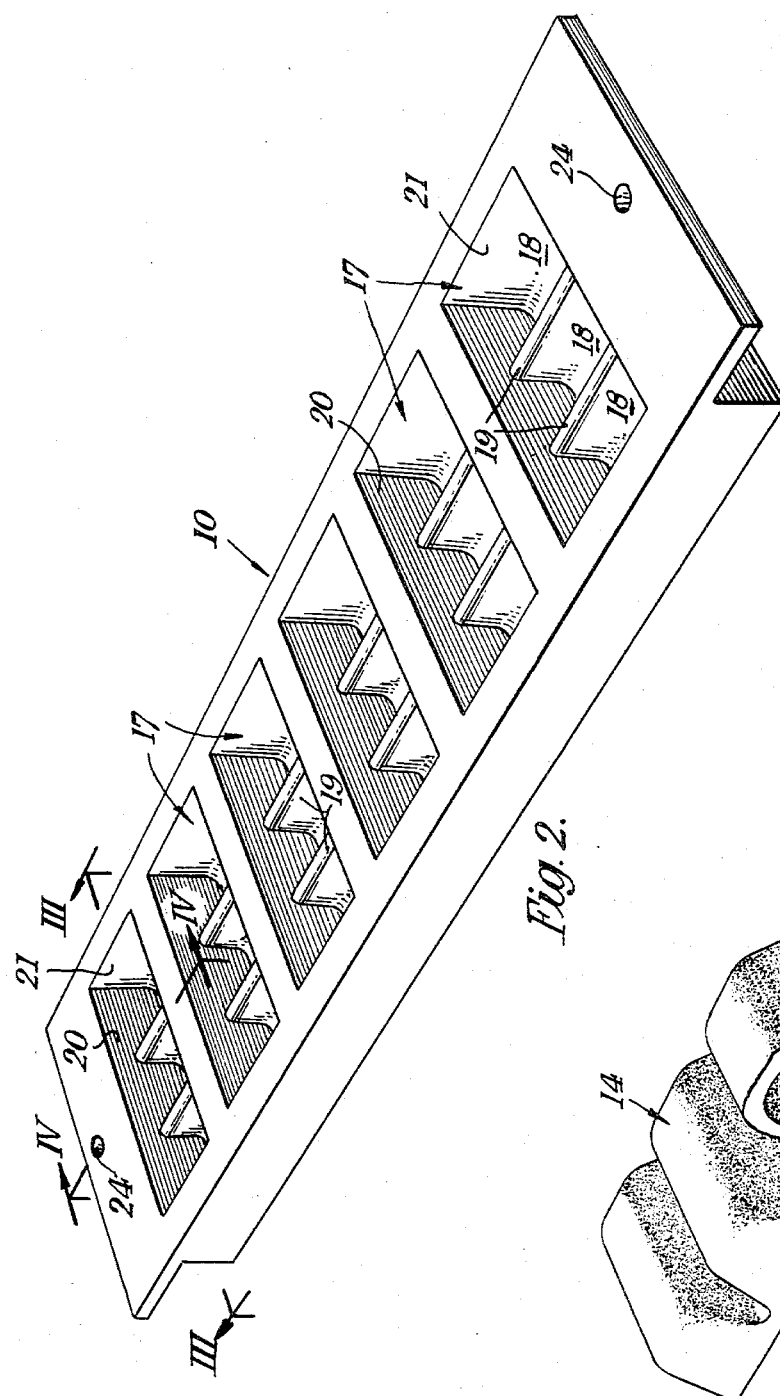
Figure 5:
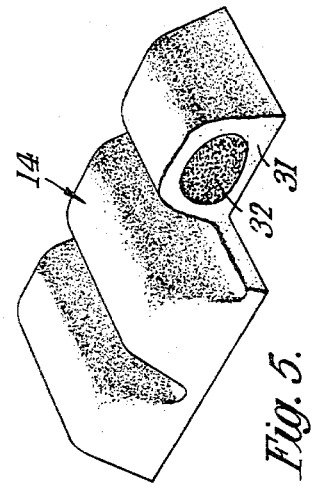
Figure 6:
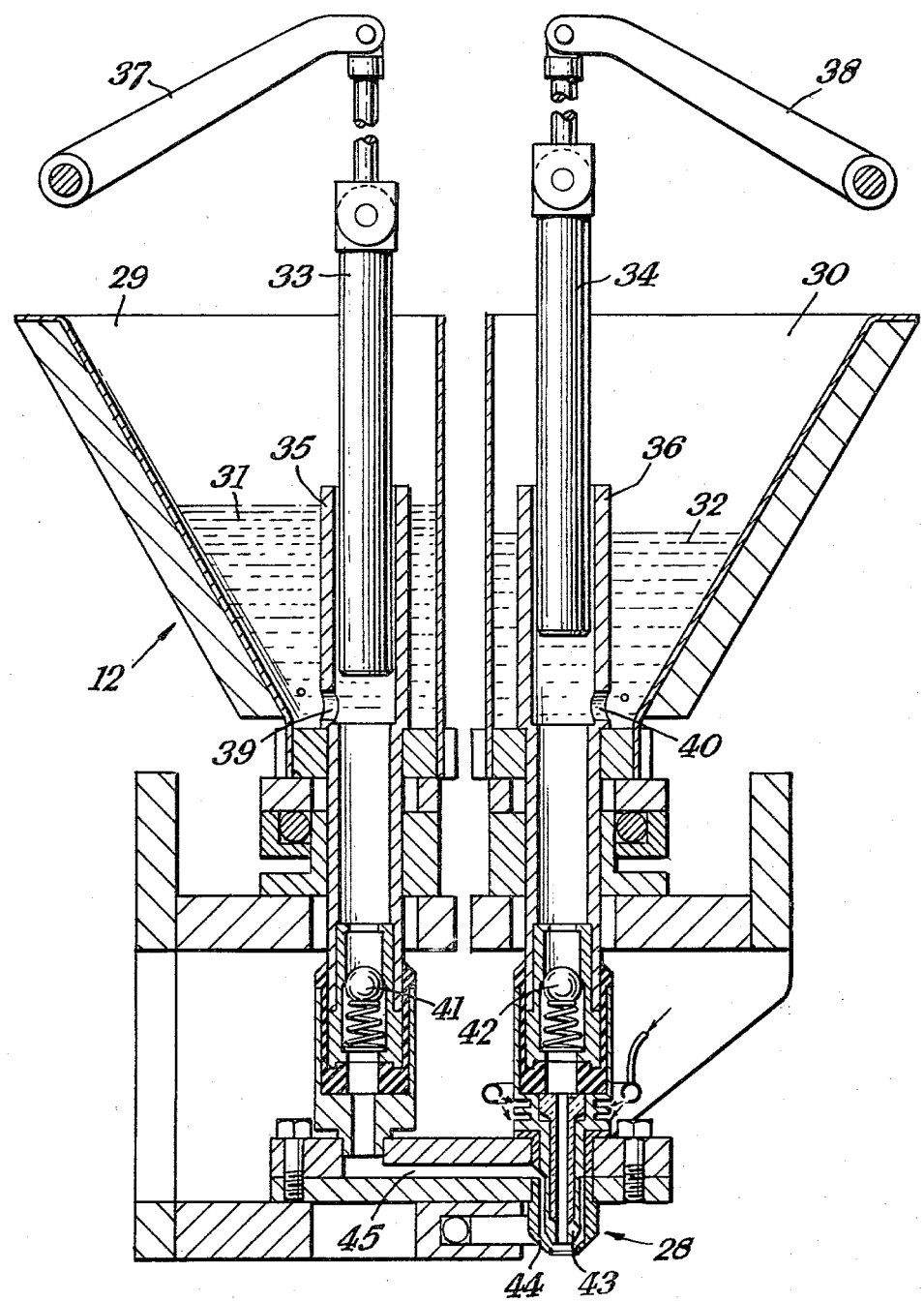

The accompanying drawings show an apparatus for manufacturing, by the above-described process, three-segment bars consisting of an outer shell of toffee with centre fillings of chocolate. In the drawings:

FIG. 1 is a side view of the apparatus,

FIG. 2 is a perspective view, on a larger scale, of one of the trays but omitting the chains to which the mould is attached, FIG. 3 is a sectional view on the line III—III in FIG. 2, FIG. 4 is a sectional view on the line IV—IV in FIG. 2, FIG. 5 is a perspective view of a moulded bar, partially broken away to show the centre filling, FIG. 6 is a sectional view illustrating the depositor, and FIGS. 7-12 are diagrams illustrating successive stages in the deposition.

The apparatus illustrated includes, as shown in FIG. 1, a procession of trays 10 which are advanced by an intermittently moving chain conveyor, including a pair of parallel chains, which extend around end sprockets 11, one of which is driven, and are connected to opposite ends of the trays 10, beneath a depositor 12 which deposits confectionery into moulds forming part of the trays as later described while the trays are travelling along the upper run of the conveyor with the mould cavities. After leaving the depositor 12 the trays pass through a cooling enclosure 13. Towards the end of the lower run of the conveyor the cooled bars 14 are discharged from the mould cavities by a demoulding device 15 onto a discharge belt 16.

As shown in FIGS. 2-4, each tray 10, which is made of flexible material, includes a number of moulds 17, each of which is divided into three moulding cavities 18 separated by webs 19. The cavities 18 have side and end walls, 20, 21, respectively, which are higher than the webs 19. The trays 10 are connected at their opposite ends to the chains 22 of the conveyor by fasteners 23, which pass through holes 24 in the trays to engage brackets 25 attached to the chains. The chains 22 include rollers 26 which run on rails 27.

The depositor 12 is illustrated in more detail in FIG. 6 and is of the construction described more fully in British Specification No. 1510413. It includes a series of coaxial nozzles 28, disposed in a row extending transversely to the direction of travel of the conveyor, and each serving to deposit confectionery into one of the moulds 17 in each tray 10. The depositor includes two completely separated and independently heated hoppers 29, 30 which respectively contain shell forming material 31 (i.e. toffee) and filling material 32 (i.e. chocolate) and pairs of independently operated plungers 33, 34, one for each coaxial nozzle 28, which are reciprocable in sleeves 35, 36 by respective cam-operated levers 37, 38.

In the upper position of the plungers 33, 34 shown in FIG. 6, the portions of the sleeves 35, 36 beneath the plungers fill with material from their respective hoppers through inlet ports 39, 40 in the sleeves. When the plungers move down, they close the inlet ports 39, 40 and discharge material to the associated coaxial nozzle 28 through respective spring-loaded ball valves 41, 42.

Each coaxial nozzle 28 includes inner and outer nozzles 43 and 44 respectively. The inner nozzle 43 is disposed directly beneath the plunger 34 and the outer nozzle 44 receives material from the plunger 33 through a passage 45.

As more fully described in British Pat. Nos. 1,481,177 and 1,510,413, the plungers 33, 34 are timed to operate so that shell material 31 is first delivered to each mould cavity 18 by the plunger 33 through the outer nozzle 44, shell and filling materials 31, 32 are then delivered simultaneously through both nozzles 44, 43 so that the filling material 32 is introduced into the deposit 46 (FIG. 7) produced in each mould cavity 18 and finally shell material 31 only is delivered so that the filling material 32 in the deposit is completely enveloped in shell material 31.

The method by which the deposits 46 are made in successive cavities 18 in each mould 17 will now be explained with reference to FIGS. 7-12 in which the moulds are assumed to be moving from right to left beneath each coaxial nozzle 28. Each of the nozzles 28 of the depositor 12 operates simultaneously at each dwell of the chain conveyor 22 to make deposits in corresponding cavities 18 of the moulds 17.

Figure 7:
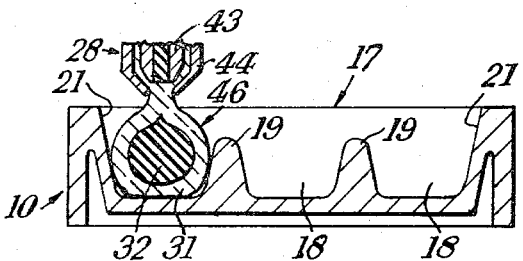
Figure 8:
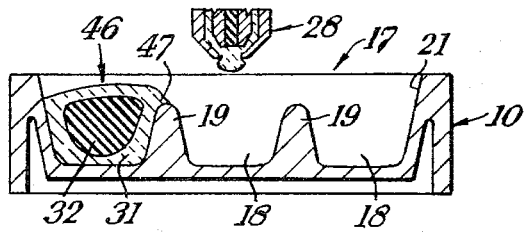
Figure 9:
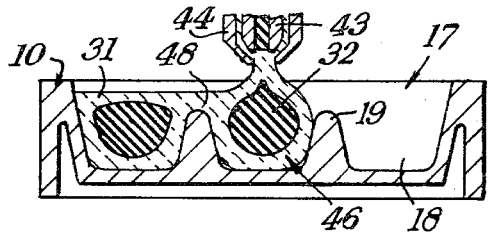
Figure 10:
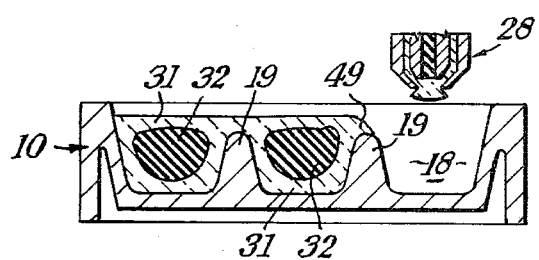
Figure 11:
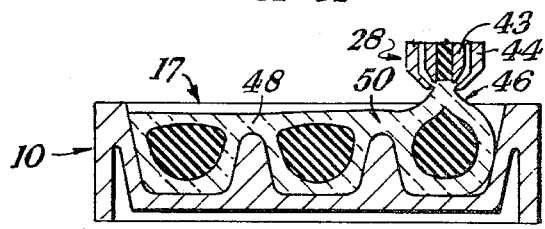
Figure 12:
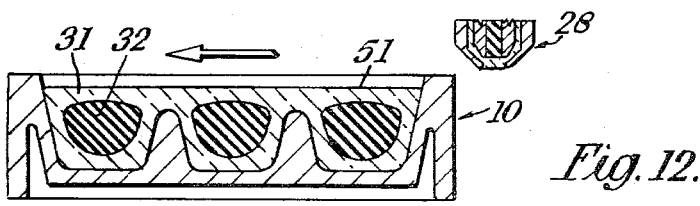

FIG. 7 shows the initial stage of the formation of the deposit in the first cavity 18 of a mould 17. By the time the mould has moved on to the position shown in FIG. 8, part 47 of the shell material 31 has overflowed onto the web 19 between the first and second cavities. FIG. 9 shows the second deposit made in the second cavity with shell material 31 of the two deposits joined over the web 19 between the two cavities as indicated at 48. At the later stage shown in FIG. 10, shell material 31 has overflowed at 49 from the second deposit onto the web 19 between the second and third cavities. FIG. 11 shows the third deposit made and joined to the second deposit at 50. FIG. 12 shows the moulding completed with a level top surface 51 which forms a flat base for the bar 14 (FIG. 5) finally demoulded by the demoulder 15.

As an alternative to traversing the moulds 17 in succession beneath a depositor 12 which remains stationary by a chain conveyor 22 which dwells while each cavity 18 is filled, the moulds 17 can be conveyed continuously beneath a moving head depositor 12, which advances at the same velocity as the conveyor during the deposit stroke and is then rapidly returned into position above the next mould cavity. A typical moving head depositor is described in British Specification No. 405374.

The amount of material is closely metered for each deposit 46 and it can be arranged that the amounts of material deposited per cavity 18 of each mould are slightly decreased for each successive cavity in mould. This can be achieved by suitable design of the cam mechanism controlling the plungers 33, 34 which deliver material to the coaxial nozzles 28. This ensures that the last deposit in a cycle will not exceed the amount required to fill the last cavity bearing in mind that little overflow is required from the last cavity as is apparent from FIG. 10.

While the apparatus described above produces three-segments bars, it will be understood that it can readily be modified, by the use of appropriate different moulds and changes in the timing of operation of the plungers of the depositor 12, to produce bars with two segments or with four or more segments.

What we claim as our invention and desire to secure by Letters Patent is:

1. A process for the production of bars of centre-filled confectionery, each of said bars having a flat base of shell material and a number of protuberances all of shell material, said protuberances being separated by thin portions of said base and each protuberance containing a filling of material different from the shell material which is completely enclosed by the shell material, which process comprises moving in succession into position beneath a depositor the cavities of a mould containing a plurality of aligned cavities separated by webs and having side and end walls which are higher than said webs, and delivering from said depositor into each of said cavities without relative movement between the depositor and the cavity a globular deposit, consisting of filling material totally enclosed by shell material, in an amount sufficient to cause shell material only of said deposit to overflow from said cavity onto the web separating said cavity from an adjoining unfilled cavity, successive deposits being made in sufficiently rapid succession for the overflowing portions of shell material on said webs to join together to form the flat base of a bar.

2. A process according to claim 1, in which the amounts of shell and filling material deposited in each cavity of the mould is slightly decreased for each successive cavity in the mould.

* * * * *